United States Patent
Lucisano et al.

(10) Patent No.: US 12,528,522 B2
(45) Date of Patent: Jan. 20, 2026

(54) SYSTEM FOR AUTOMATIC COUPLING AND RELEASE OF VEHICLES TRAVELLING ON THE RAIL NETWORK

(71) Applicant: CO.EL.DA. SOFTWARE SRL, Reggio di Calabria (IT)

(72) Inventors: Antonio Lucisano, Reggio di Calabria (IT); Francesco Lucisano, Reggio di Calabria (IT); Maurizio Lucisano, Reggio di Calabria (IT)

(73) Assignee: CO.EL.DA. SOFTWARE SRL, Reggio di Calabria (IT)

( * ) Notice: Subject to any disclaimer, the term of this patent is extended or adjusted under 35 U.S.C. 154(b) by 487 days.

(21) Appl. No.: 18/251,931

(22) PCT Filed: Nov. 5, 2021

(86) PCT No.: PCT/IB2021/060254
§ 371 (c)(1),
(2) Date: May 5, 2023

(87) PCT Pub. No.: WO2022/097077
PCT Pub. Date: May 12, 2022

(65) Prior Publication Data
US 2024/0001974 A1    Jan. 4, 2024

(30) Foreign Application Priority Data
Nov. 6, 2020   (IT) ......................... 102020000026596

(51) Int. Cl.
*B61G 1/20*    (2006.01)
*B61G 1/24*    (2006.01)
(Continued)

(52) U.S. Cl.
CPC ................. *B61G 1/20* (2013.01); *B61G 1/24* (2013.01); *B61G 7/06* (2013.01); *B61G 7/12* (2013.01)

(58) Field of Classification Search
CPC ... B61G 5/06; B61G 1/22; B61G 7/06; B61G 7/08; B61G 7/12; B61G 5/04; B61G 1/18
(Continued)

(56) References Cited

U.S. PATENT DOCUMENTS

| 6,253,786 B1 * | 7/2001 | Maa | B61G 5/06 137/614.04 |
| 2007/0093112 A1 * | 4/2007 | Macey | B60D 1/64 439/352 |

FOREIGN PATENT DOCUMENTS

| CN | 110588703 A | * 12/2019 | ............. B61K 11/00 |
| CN | 113415304 A | *  9/2021 | ............... B61G 9/20 |

(Continued)

OTHER PUBLICATIONS

International Search Report issued on Mar. 4, 2022, in corresponding International Application No. PCT/IB2021/060254, 2 pages.
(Continued)

*Primary Examiner* — Troy Chambers
(74) *Attorney, Agent, or Firm* — Maier & Maier, PLLC

(57) ABSTRACT

A system for automatic coupling and release of at least a first vehicle having a cushioning system and of a second vehicle travelling on the railway network, at least a first hooking group of the first vehicle; a retractable screw body; and a horizontal shaft. At least a second hooking group of the second vehicle, includes an automatic head including a first and a second terminal element configured to be coupled to each other with complementary interlocking. The frontal structure of the first hooking group includes the retractable (Continued)

screw body, the first hooking group includes a tubular cavity; and the second hooking group comprises a thread.

6 Claims, 16 Drawing Sheets

(51) Int. Cl.
  B61G 7/06 (2006.01)
  B61G 7/12 (2006.01)
(58) Field of Classification Search
  USPC .......................................... 213/174; 439/352
  See application file for complete search history.

(56) References Cited

FOREIGN PATENT DOCUMENTS

| DE | 21728 | C |   | 5/1883 | | |
| DE | 19545396 | A1 | * | 6/1997 | ............... | B61G 3/00 |
| DE | 10162515 | A1 | * | 7/2003 | ............... | B61G 7/08 |
| DE | 102023102659 | A1 | * | 8/2024 | ............... | B61G 3/20 |
| EP | 1602547 | A1 | * | 12/2005 | ............... | B61G 5/06 |
| FR | 324908 | A |   | 4/1903 | | |
| GB | 2578650 | B | * | 12/2020 | ............... | B61G 9/14 |
| IT | 1416154 | B1 |   | 5/2015 | | |
| IT | 201600110440 | A1 | * | 5/2018 | ............... | B61G 7/10 |
| IT | 201900007566 | A1 | * | 11/2020 | ............... | B61G 7/12 |
| IT | 102019000007566 | A1 |   | 11/2020 | | |
| WO | WO-2005000658 | A1 | * | 1/2005 | ............... | B61G 5/06 |
| WO | WO-2018072611 | A1 | * | 4/2018 | ............... | B61G 7/10 |

OTHER PUBLICATIONS

Gattuso Domenico et al: "Automated rail wagon for new freight transport opportunities", 2017 5th IEEE International Conference on Models and Technologies for Intelligent Transportation Systems (MT-ITS), IEEE, Jun. 26, 2017 (Jun. 26, 2017), pp. 57-62, 6 pgs.

* cited by examiner

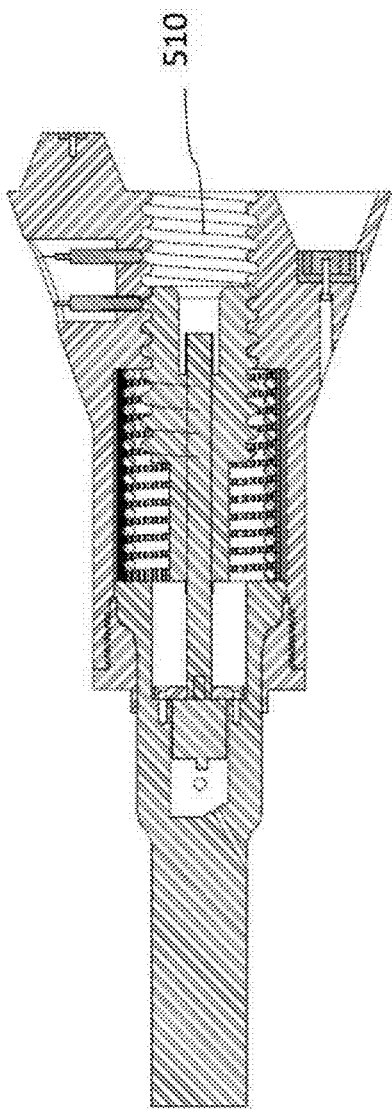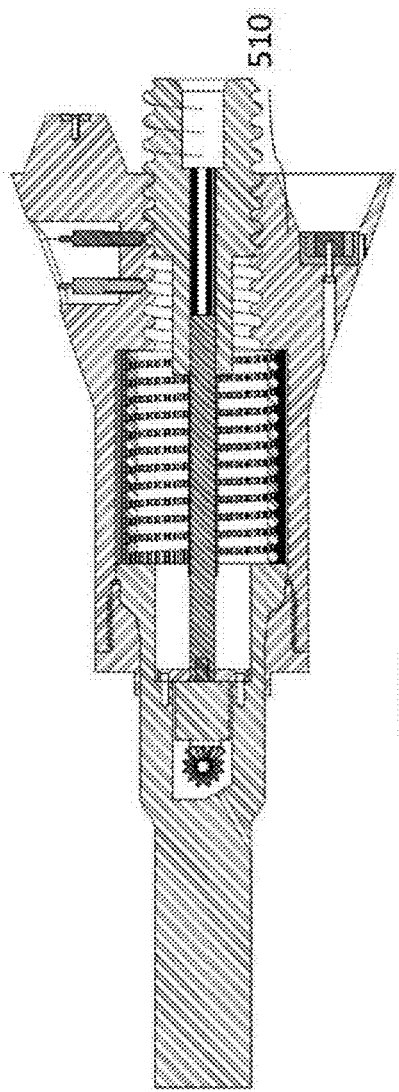
FIG. 6

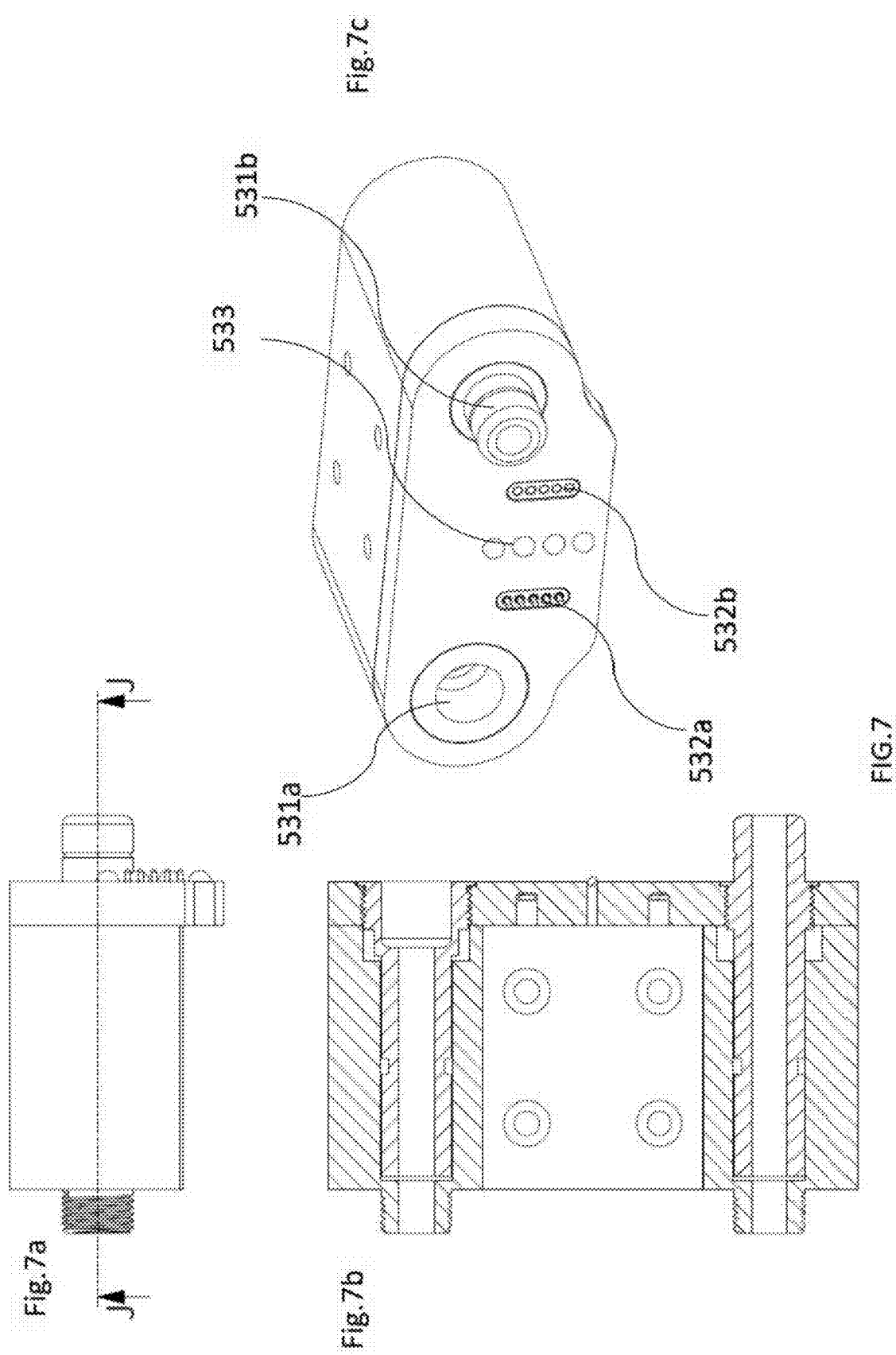

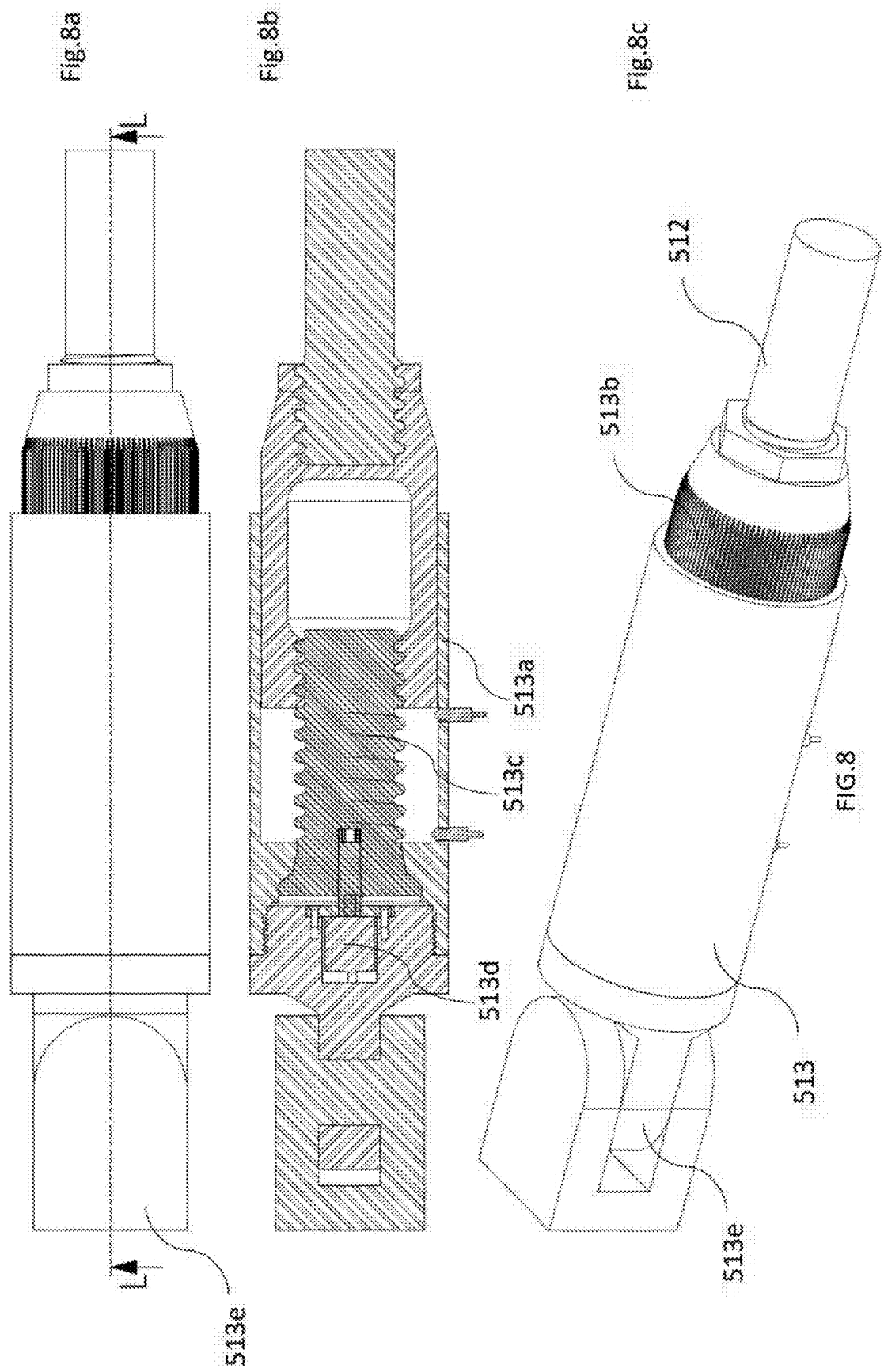

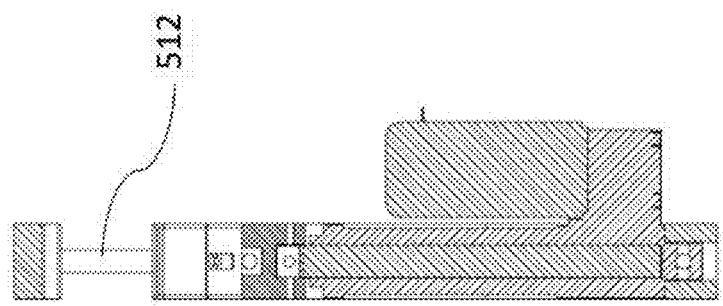
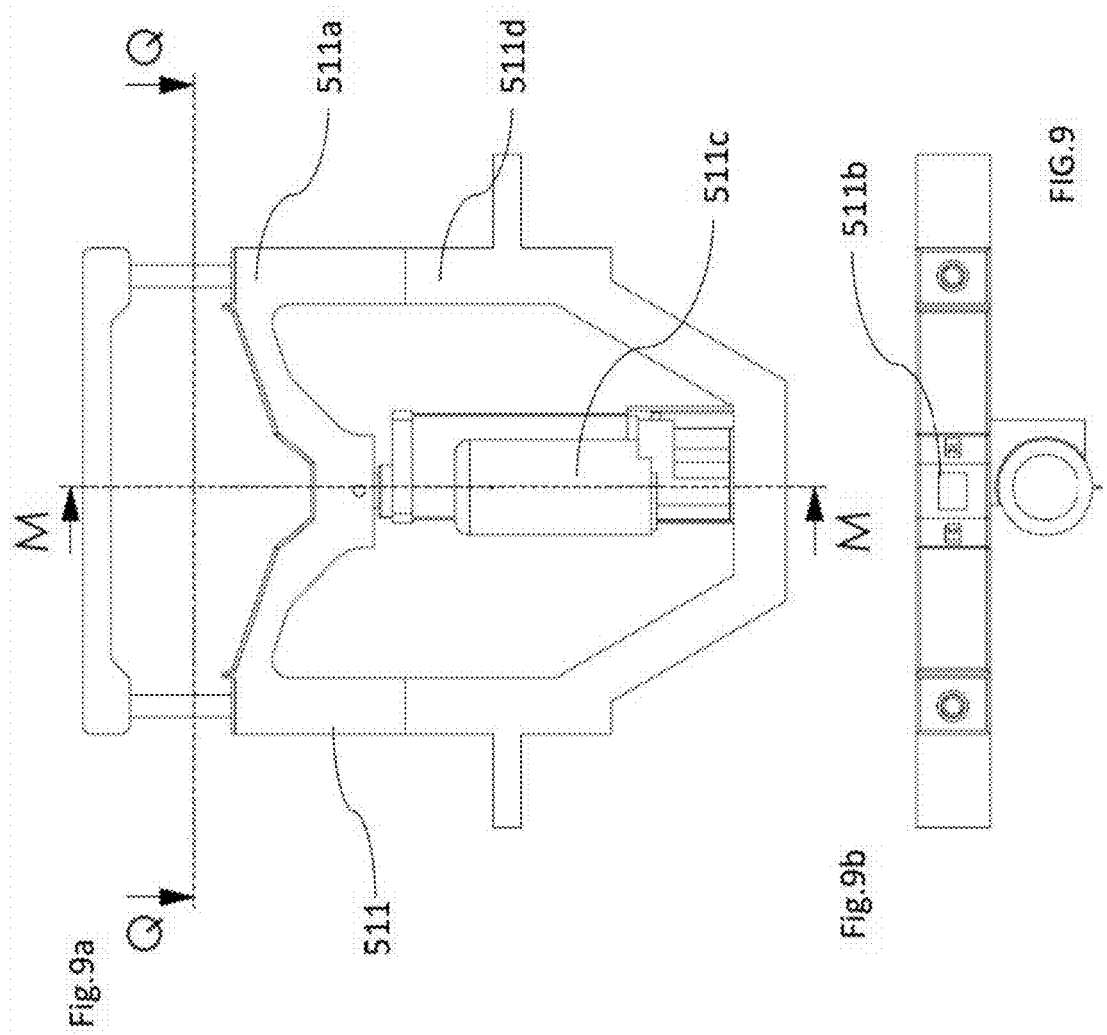

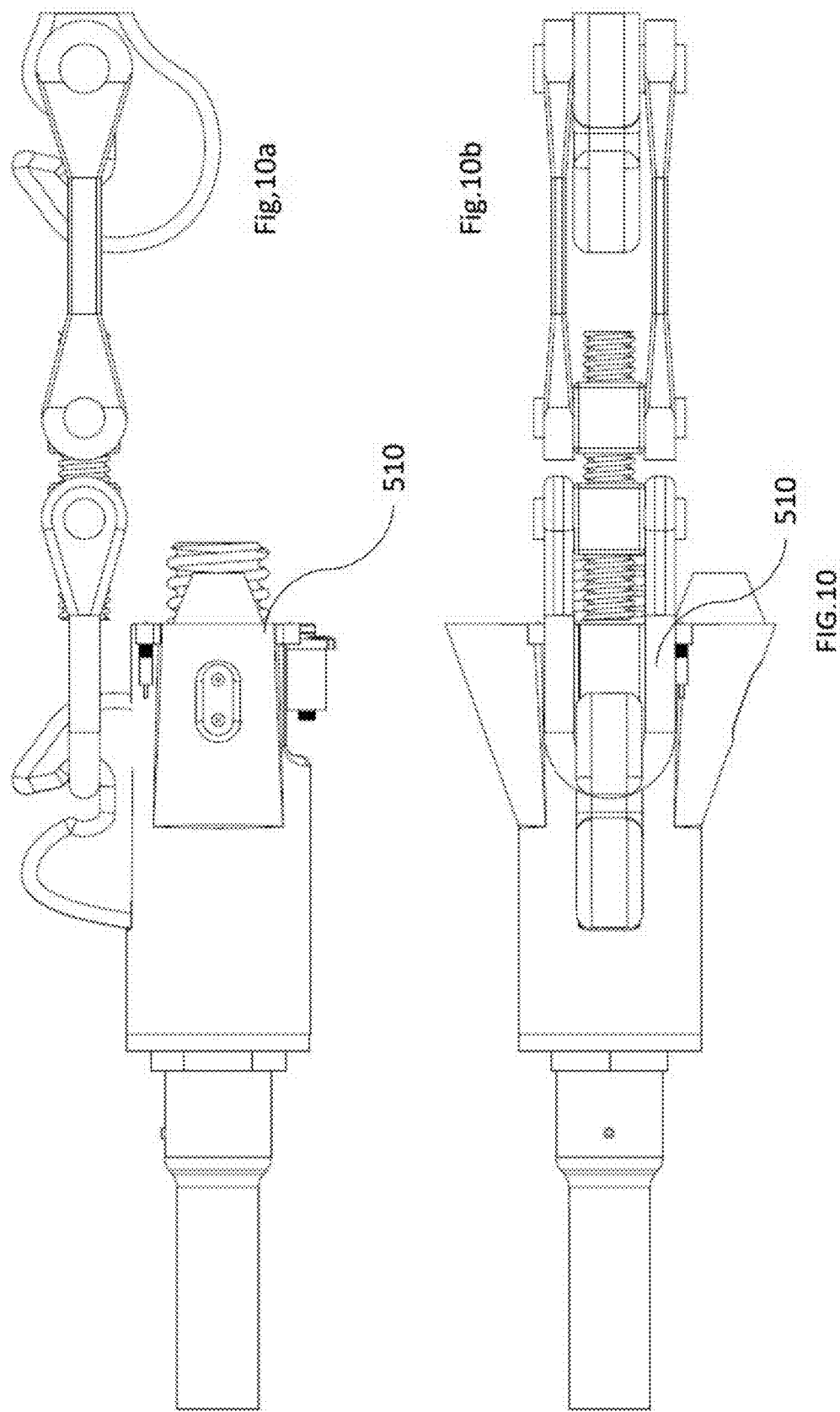

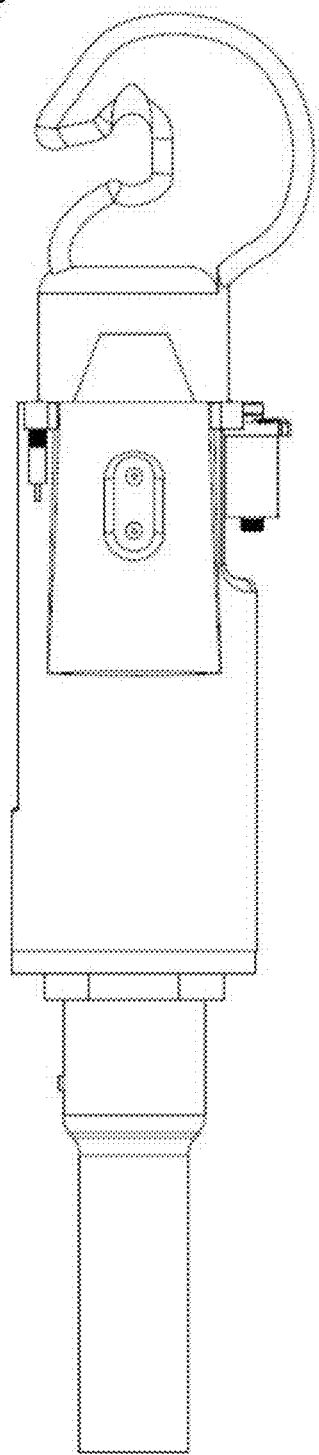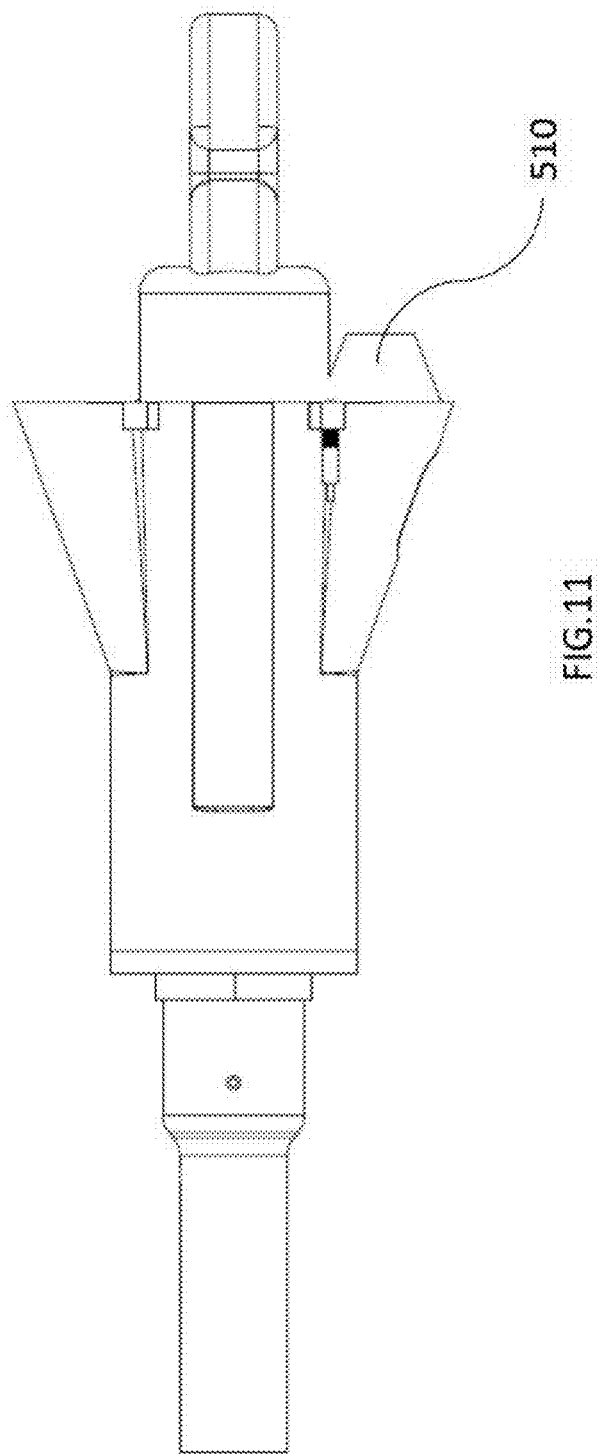
FIG.11

SYSTEM FOR AUTOMATIC COUPLING AND RELEASE OF VEHICLES TRAVELLING ON THE RAIL NETWORK

FIELD

The present invention relates to a system for automatic coupling and release of vehicles travelling on the railway network.

In particular, the present invention relates to a system for automatic coupling and release of vehicles travelling on the railway network, of the type of railway wagons, traction vehicles and services circulating on both traditional and "intelligent" tracks, in the meaning that the term has been attributed with reference to the wagons of a railway transport system with automatic train composition described in the Italian patent No. 0001416154 in the name of the same Applicant.

BACKGROUND

As is known, currently the coupling and uncoupling operation between railway wagons is performed using systems that require the presence of operators to connect the wagons together, both in the traction components, both in the braking components, and possibly for connections with which to make electrical connections. These systems are therefore not automatic, but subject to the presence of operators.

To try to overcome this problem, automatic coupling systems similar to those originally designed by Scharfenberg have been developed, but their operation always presupposes that one of the two vehicles is stationary and the other approaches with extremely low approach speed. Therefore, they are not suitable for particular applications, such as the coupling between moving wagons, since they have no system to automatically check in advance the existence of the coupling conditions.

Furthermore, the way in which some automatic couplings have been developed makes them unsuitable for freight transport where extremely high tensile stresses are required, generally not bearing stresses of a certain importance.

Finally, the current systems are not designed to carry out frequent coupling and release operations, and do not require that, in addition to the traction connections and the pneumatic components for the braking system and electrical components for the services, among the systems to be connect in the coupling phase, also electronic connections to allow the exchange of information between computerized systems located on the two means to be coupled/unhooked are present.

Furthermore, there is no remote verification system of the couplings, whose certification procedure is always entrusted to an operator.

Furthermore, the coupling maneuver is not assisted by any sensor component that guides the phases and the correctness of the maneuver. Therefore, these systems do not allow an exchange of information to take place if computerized systems are present in the two means to be coupled or uncoupled, such as those present in the "intelligent" wagons of the aforementioned patent of the same Applicant.

Furthermore, with the known systems, the current wagons in circulation should be re-approved by changing the elastic system for connecting to the other wagons in the train.

SUMMARY

A solution to this problem has been presented by the Applicant in the Italian patent application 102019000007566 which describes an automatic coupling and uncoupling system of a first vehicle having a damping system and of a second vehicle circulating on the railway network comprising: —at least a first group coupling of the first circulating means and at least one second coupling group of the second circulating means, comprising an automatic head comprising a first and a second terminal element which can be coupled to each other with complementary interlocking consisting of a front structure provided with a first protrusion, projecting horizontally towards the outside of the first or second hooking group, and of a second protrusion projecting horizontally towards the inside of the first or second hooking group, the first protrusions having such sections as to be complementary to the second protrusions; —at least one vertical lateral alignment apparatus of said at least one first hooking group and of said at least one second hooking group, to which it is connected by means of a connecting element, controlled by a computer system present on the first circulating vehicle and on the second circulating vehicle; and —at least one apparatus for adjusting the horizontal positioning of the first hooking group and of the second hooking group; in which the automatic head has: —in an upper portion of the front structure, a protuberance in the form of a unified hook; —a screw body included in the first protrusion, prominent towards the outside and insertable in the second protrusion of the head of the second hooking group; and —a shaft coupled to the screw and operable in screwing and unscrewing by means of an actuator.

However, this solution presents some criticalities for very high values of the towing resistance and is not scalable.

The object of the present invention is to provide a system for automatic coupling and release of vehicles travelling on the railway network, which is simple and compact, with very high towing resistance, which can be sized according to the necessary requirements with appropriate sizing of the components, having characteristics such as to overcome the limits that still affect the solutions previously described with reference to the known art.

According to the present invention, a system for automatic coupling and release of vehicles travelling on the railway network is provided.

BRIEF DESCRIPTION OF THE FIGURES

For a better understanding of the present invention, a preferred embodiment is now described, purely by way of non-limiting example, with reference to the attached drawings, in which:

FIGS. 6a-6b show perspective views from above in section of the hooking unit of FIGS. 2a-2c with a coupling screw respectively in the waiting position for coupling (FIG. 6a) and in the position of coupling completed (FIG. 6b), according to the invention;

FIGS. 7a-7c show respectively lateral, top section and three-dimensional perspective views of an air/data/current coupling unit, according to the invention;

FIGS. 8a-8c show schematic top, sectional and three-dimensional views respectively of a horizontal alignment apparatus of the first embodiment of the system for automatic coupling and release of vehicles travelling on the railway network, according to the invention;

FIGS. 9a-9c show schematic views, respectively, front, side in section and from above of a horizontal and vertical positioning bar of the first embodiment of the system for automatic coupling and release of vehicles travelling on the railway network, according to the invention;

FIGS. 10a-10b show a schematic side and top view of the hooking group of FIGS. 2a-2c in the coupling phase with a traditional manual hook, according to the invention;

FIGS. 11a-11b show a schematic side and top view of the hooking group of FIGS. 2a-2c with hook adapter screwed at the head of the hooking group, according to the invention;

DETAILED DESCRIPTION

Figure 1:
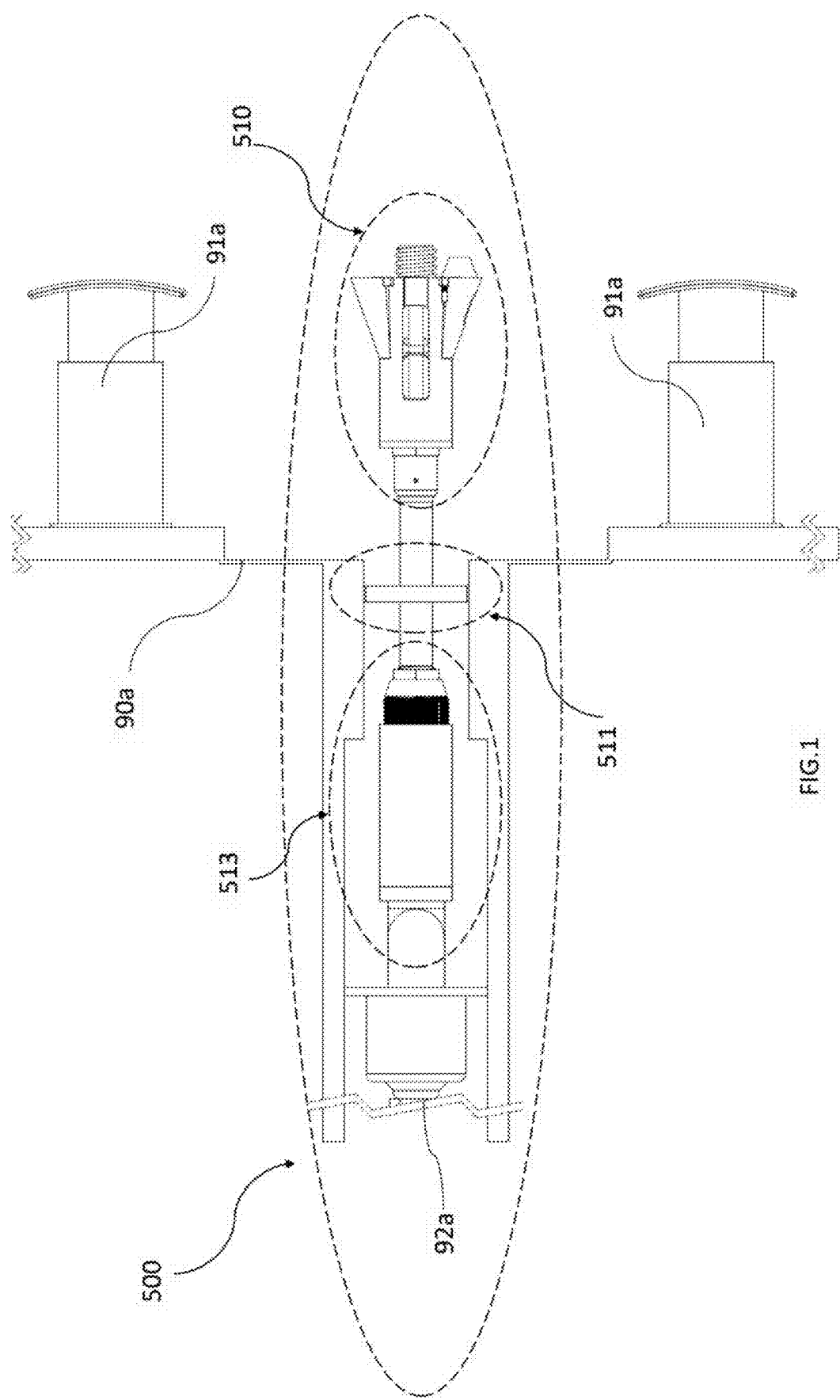
FIG. 1 shows a schematic top view of a first embodiment of a system for automatic coupling and release of vehicles travelling on the railway network, according to the invention.

With reference to these figures and, in particular, to FIG. 1, a system for automatic coupling and release of vehicles travelling on the railway network is shown, according to the invention. In particular, a first embodiment of the system 500 for automatic coupling and release of vehicles travelling on the railway network shown for the portion relating to a first circulating vehicle for example a railway wagon with buffers 91a and elastic traction damping system 92a, comprises a first hooking group 510 of the first circulating vehicle and a second hooking group of a second circulating vehicle, not shown in the figure. The first hooking group 510, identical to the second hooking group, consists of a block comprising joint elements, both traditional and automatic, with a second circulating medium, a section with electrical, electronic and pneumatic connections, a group of sensors, components of implementation and control, verification and surveillance systems.

The description made here for the first hooking group is to be considered equally valid for the second hooking group.

Advantageously according to the invention, the system 500 is of the type reported in the Italian patent application 102019000007566 of the same Applicant, already cited.

Advantageously according to the invention, the cushioning device 92a, already present on traditional wagons, represents the component to which the new automatic hooking group 510 is connected in replacement of the current pole with traditional hook.

Figure 2:
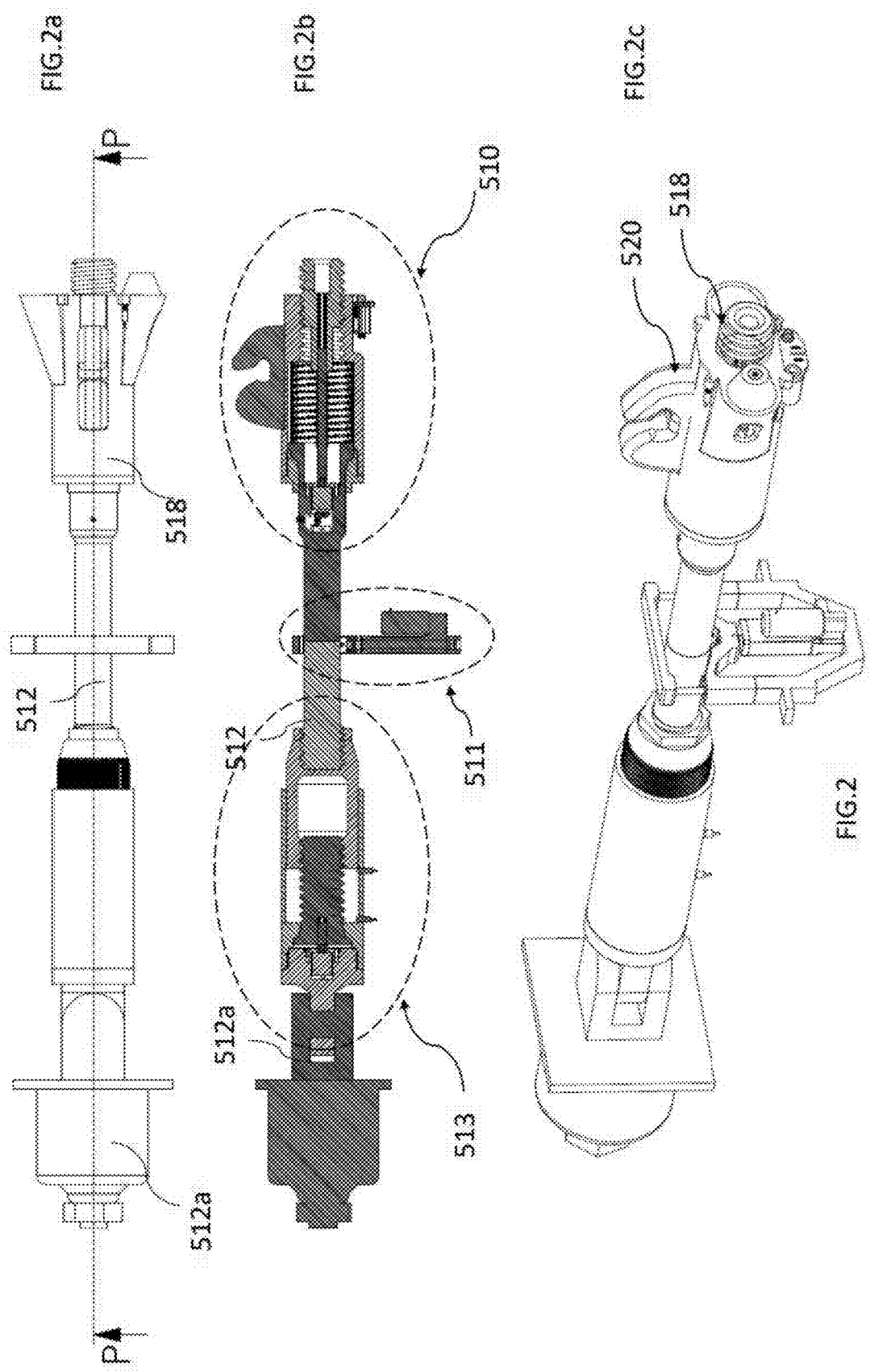
FIGS. 2a-2c show schematic views respectively from above, in lateral and three-dimensional section of a hooking unit, of a vertical alignment unit and of a horizontal alignment unit of the first embodiment of the system for automatic coupling and release of vehicles travelling on the railway network, according to the invention.

Each hooking group, for example the hooking group 510, as shown in FIG. 2, is connected to an apparatus 513 for adjusting the horizontal positioning of the hooking group 510 along the head-tail line of the circulating vehicle, or wagon, 90a, and to an adjustment unit 511 for vertical positioning.

Figure 3:
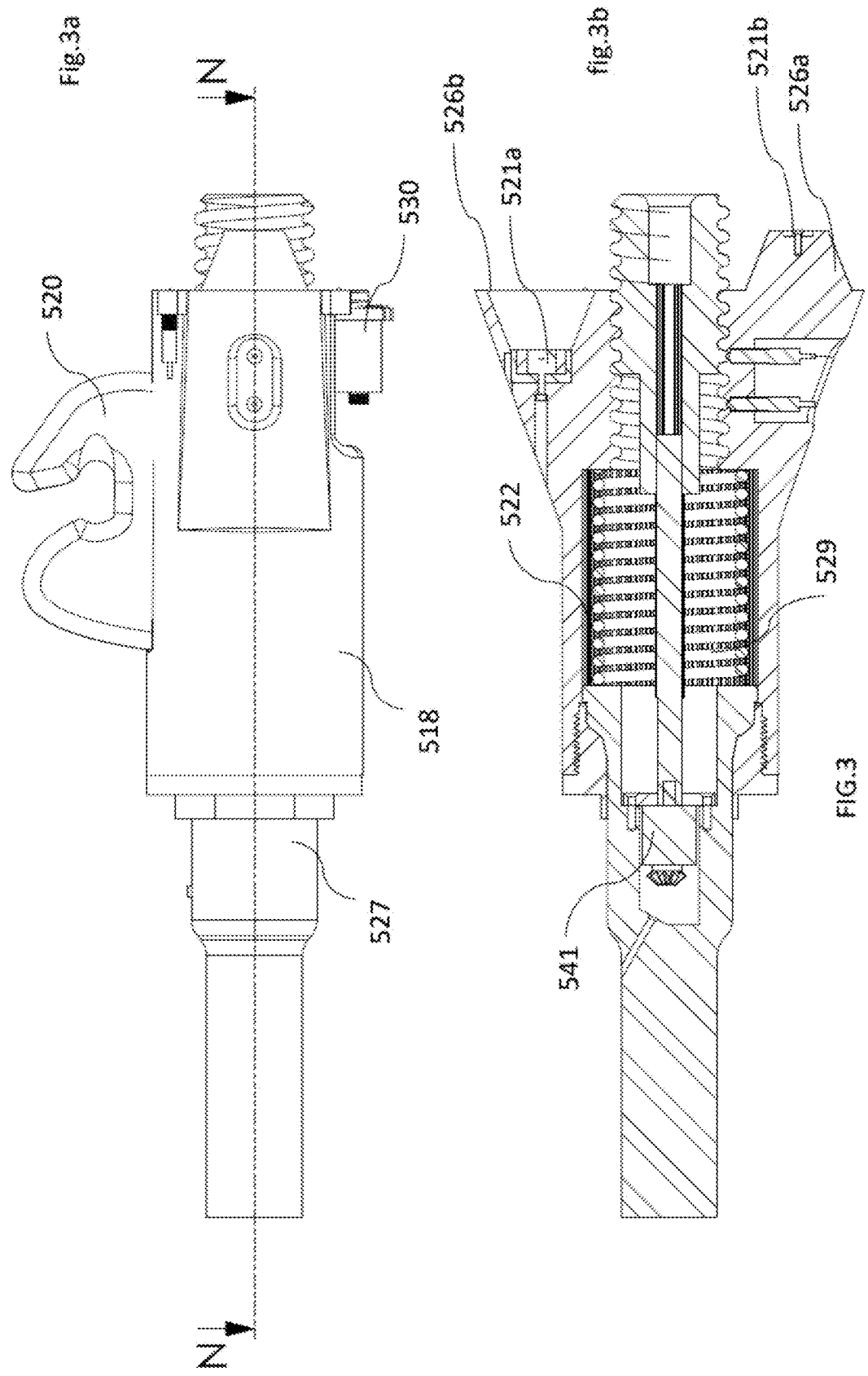
FIGS. 3a-3b show schematic views, respectively, lateral and in section from above of a detail of the hooking group of FIGS. 2a-2c, according to the invention.
Figure 4:
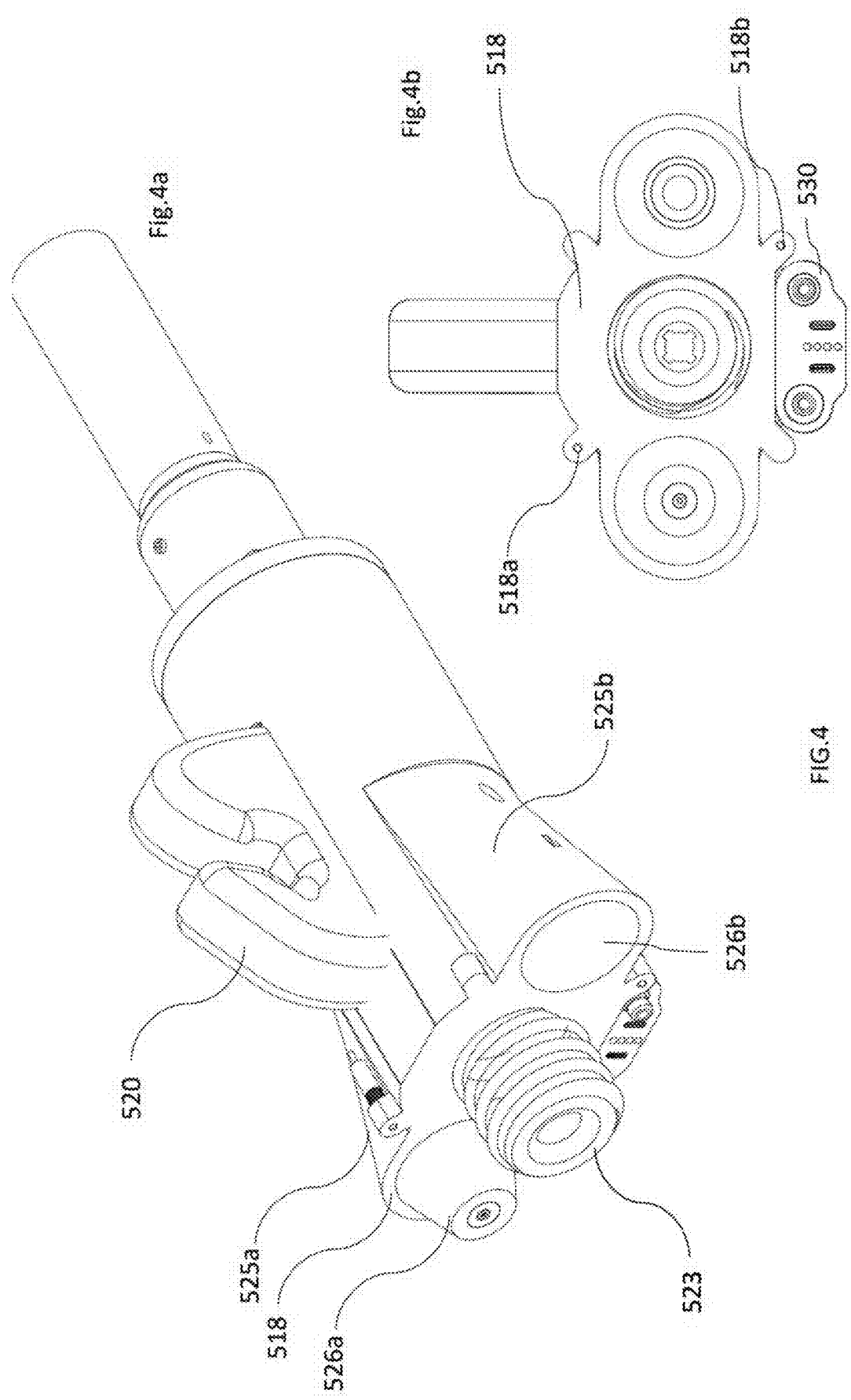
FIGS. 4a-4b respectively show a three-dimensional schematic view and a front view of the hooking group of FIGS. 2a-2c, according to the invention.
Figure 5:
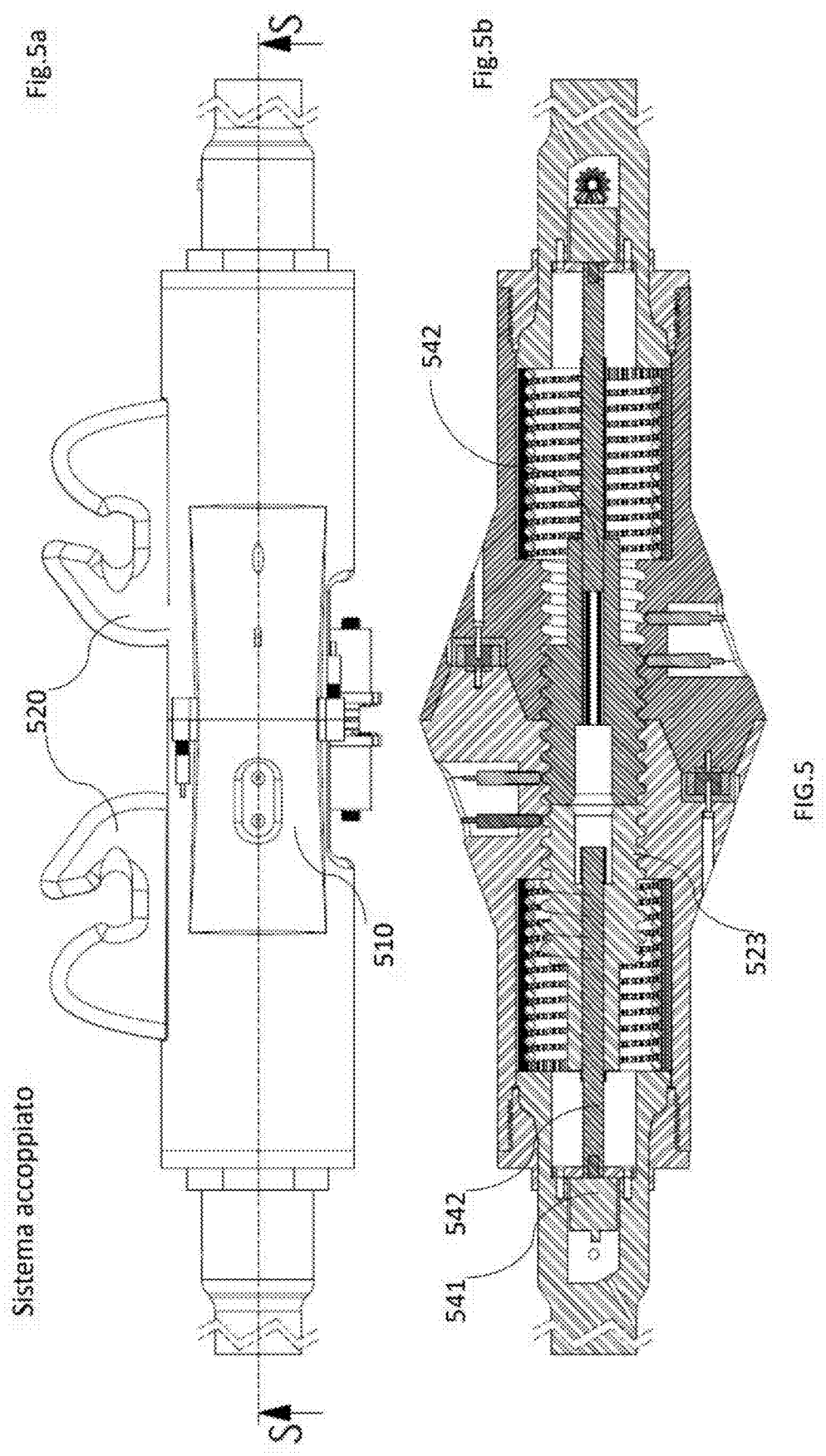
FIGS. 5a-5b show respectively a schematic side view and a top sectional view of a first hooking unit of the type of FIGS. 2a-2c of a first vehicle circulating on the railway network, coupled to a second hooking unit of the type FIGS. 2a-2c of a second vehicle circulating on the railway network, according to the invention.

According to an aspect of the invention, better shown in FIGS. 2-4, and in particular in FIG. 4, the hooking group 510 comprises an automatic head comprising a frontal structure 518 comprising two truncated cones 525a and 525b with two protrusions at the head, the first 526a facing outwards and the other 526b facing inwards, so as to be complementary in coupling with those of a second hooking unit 510' located in the opposite position, as shown in FIG. 5. The frontal structure 518, moreover, it comprises, in a central region between the two truncated cones 525a and 525b, a retractable screw 523, in retraction, inside a tubular cavity 522 of the hooking unit 510 or insertable, in advance, inside a corresponding thread included in the head of a second hooking group to be coupled to the first hooking group, in such a way that it can be screwed inside it and in such a way as to also guarantee the union of the two heads 510 and 510' of the first and second hooking group.

As shown in FIG. 5, the head of the first hooking group 510 comprises a horizontal shaft 542 coupled to screw 523 and operable by means of an actuator 541, configured to advance and screw 523 into the thread included in the head of a second hooking group or to move it back into position into the tubular cavity 522.

More specifically, according to one aspect of the invention, the screw body 523 is internally hollow to allow the shaft 542 to slide inside it during the screwing or unscrewing operation.

Therefore, advantageously according to the invention, the release between the two hooking groups does not require an external gear, taking place through the internal actuator 541, so as to give more compactness and prevent dust and dirt from penetrating inside the system 500.

According to another aspect of the invention, as shown in FIGS. 3, 4, 5, 10 and 11, the body 518 has, in its upper portion, a protuberance 520 in the shape of a unified hook in accordance with EN 15566.

According to a further aspect of the invention, as shown in FIG. 3b, inside the recess 526a there is an electromagnet 521b and in the protrusion 526b a metal plate 521a, which can be coupled respectively to a metal plate and an electromagnet present in the protrusion and in the recess of the second hooking group. During the coupling phase of the two hooking groups, by magnetically coupling each electromagnet with the respective plate, the block in the appropriate seat of the corresponding cone 525a opposite to it of the head of the second hooking group 510' is guaranteed.

According to an aspect of the invention, as shown in FIG. 2b, a connecting element 512 joins the first hooking group 510 to the horizontal positioning adjustment apparatus 513 and has a first part 512a grooved externally and inserted in the first hooking group 510, such as described above, and a second threaded part 512b integral with element 513b, shown in FIG. 8c. The central part of the structure 518 is hollow grooved internally continuing with the tubular cavity 522, inside which there is a spring 529 shown in FIG. 3b, which dampens the movements of the connecting element 512.

According to an aspect of the invention, as shown in FIG. 4b, the body 518 has, in its lower part, a structure 530, better shown in FIG. 7, comprising pneumatic connections 531a and 531b, electrical 533 and electronic 532a and 532b.

According to one aspect of the invention, in the structure 530 connected to the air fittings there are, not shown in the figure, pressure gauges and electronic valves with air flow control managed by the electronic system from which they are managed and with which they communicate.

The structure 530 is movable horizontally along the body 518 shaped for the forward and backward sliding of the structure 530 by means of an actuator not shown in the figure. The air connection to the main line, not shown in the figure, is made by means of a flexible tube which is connected to the main line by means of a switching valve, managed by the electronic system of the wagon, which allows the passage of air from the automatic hook when in use in automatic mode, or from the traditional tap placed at the head of the wagon, when this is hooked up in classic mode. The protrusions 526a and 526b are able to couple, as described in the patent application 102019000007566, to protrusions projecting in the opposite direction of a second hooking group of a second railway vehicle, having such protrusions complementary sections to similar protrusions present in the second hooking group, so such as to be wedged one inside the other to make the coupling of the two coupling groups together.

According to an aspect of the invention, the hooking group of the type described here can also be mounted in hooking systems with a central elastic system and without buffers.

According to an aspect of the invention, as shown in FIG. 8, the horizontal length adjustment apparatus 513 is composed of a tubular element equipped, at one end, with a mechanical connector 513 and configured to anchor itself to the cushioning system 92a, to the other end of a mechanical body 513b for screwing integral with the connecting element 512. Inside the tubular part 513a there is an adjustment screw 513c held by the element 513a which is screwed to the element 513b by means of the actuator 513d, thus determining the length of the entire automatic system 500. The externally grooved element 513b slides inside the internally grooved element 513a, so as to block the rotation of the element 512. In this way, the first hooking group 510 can undergo a horizontal displacement, so that the hooking group 510 can position itself alternately either in an automatic mode or in a classic mode. The connecting element 512 has a cylinder on the head with grooves that slide in the grooved tubular cavity 522, to prevent the rotation of the hooking group 510, and locked by means of a screw nut 527.

In the automatic mode shown in FIG. 5a, the first hooking group 510 is positioned completely forward and in line with the buffers 91a, and, therefore, the second hooking group of the system 500 connected to a second circulating means to which to hook, not shown in the figures, will have the same configuration as the first hooking group 510.

In a classic mode, shown in FIG. 10, the first hooking group 510 is positioned all the way back assuming the same position that the classic tow hook normally has and is manually hooked to the traditional hook placed on a traditional wagon placed at the opposite end.

Advantageously according to the invention, the connecting element 512 is placed on the vertical and lateral alignment apparatus 511, shown in FIG. 9, with respect to the circulating vehicle 90a. This connecting element 512 can oscillate elastically inside the grooved tubular cavity 522 of the hooking group containing the repulsion spring 529. The connecting element 512 rests on the horizontal and vertical alignment apparatus 511 during the hooking/unhooking phases of the group hooking to a second circulating vehicle.

According to an aspect of the invention, as shown in FIG. 9, the horizontal and vertical alignment apparatus 511 is configured to move the connecting element 512 in a vertical and horizontal direction through a support 511d.

More specifically, the connecting element 512 in the middle part rests, during the coupling operations, on the horizontal and vertical alignment apparatus 511. This horizontal and vertical alignment apparatus 511, better shown in FIG. 9, comprises an alignment support 511a operated by an actuator 511c for vertical positioning, consisting of a base with raised edges, for example a V-shaped base, equipped, on its internal surface, including edges, with rollers 511b converging towards the center and configured to position and scroll to the connecting element 512 in the center. The alignment support 511a slides and is supported laterally by two guides integral with a lateral anchoring element 511d below the alignment support 511a and anchored to the carriage 90a.

According to an aspect of the invention, the hooking group can also be mounted in hooking systems with a central elastic system and without buffers.

In use, the system for automatic coupling and release of vehicles travelling on the railway network, used in the classic manner, provides that the coupling unit can be coupled to any currently circulating wagon and with the same methods currently in use. In this mode the actuator 513d will rotate the screw 513c configuring the hooking group as in FIG. 5b. The air connection will be carried out with the classic fittings, ignoring the automatic head, connecting with these to the traditional duct whose continuity is ensured by the switching valve installed on the carriage described above appropriately configured.

In automatic mode the wagon will only be able to connect with wagons of the same type (intelligent wagon). In this case, the hooking group is placed in the hooking position and the air connection system is entrusted to the head inlets 531a, 531b connected by means of pipes not described in the figures to the main pipe by means of the switching valve described above configured with the mode necessary for ensure the continuity of the air flow. During the approach phase of the wagons, to obtain horizontal alignment, the element 512c will be positioned above the roller base 511a. By gravity the connecting element 512 will automatically position itself correctly in the center of the base 511a, as the "V" shape of the base 511a will bring the connecting element 512 to the center. A sensor to verify the positioning in the center of the connecting element 512 is present in the center of the roller base 511a. The vertical alignment apparatus 511 will, through elaborate algorithms and distance measurements obtained with a laser sensor placed at the head of the wagon that will determine the distance from the rails of the wagon base, to vertically align the hooking units with millimeter precision. During the approach of the two wagons to be coupled, with two inertial motion units, one placed on board the wagon and the other placed on the head 510, the oscillations to which the wagon is subjected will be determined and it will be assessed whether the conditions for safety for hooking up. In the event of a negative evaluation, the speed of the wagon will be lowered until the oscillations are within the safety limits. The distance between the wagons to be coupled can be constantly monitored by a laser sensor that determines the values and communicates them to the wagon management system. Following a pre-coupling, made automatically upon contact between the heads of the two coupling units 510 and 510', obtained by means of the electromagnetic actuator consisting of the electromagnet 521b and the plate 521a, the sensor system 518a and 518b placed on the front part 518 verifies the perfect coupling of the hooking groups 510 and will order the effective sealing hooking, carrying out the retraction of the screw 523 of the group 510 and the screwing of the screw 523' of the group 510', actuated by the actuator (or electromechanical motor) 541, shown in FIG. 5b, which, by rotating the transmission shaft 542, will cause its rotation. The screw 523 is hollow on the side of the drive shaft 542 to allow its penetration during its forward and backward movement. Once the coupling has been carried out and verified, the connection of air, electricity and data will be carried out, also managed through the electronic control system of the hook which will control an actuator. To avoid compression stresses, which could compromise the components downstream of the head, the spring inserted in the cylinder 522 of the group 510 acts as a damping device allowing the oscillation of the connecting element 512 inside it with a stroke equal to that of the buffers and lower elastic resistance, so that the coupling occurs in complete safety and in case of excessive compression effort between the moving wagons when the buffers are activated.

According to another aspect of the invention, in the bodies 510 and 513 there are sensors, able to determine the relative position of the moving components.

According to another aspect of the invention, the hooking group 510 comprises sensors, not shown in the figure, to detect, during the hooking operations between wagons, the relative positions of the hooking units with relative truncated conical protuberances, with determination of the horizontal and vertical distances and of the variation interval of these distances between the hooking groups.

Advantageously according to the invention, the sensors present on the hooking group 510 mounted on the first wagon can interrogate or be interrogated by the sensors present on the rigid body of a second hooking group mounted on the second wagon, through a dialogue between computerized systems on board the wagons including the coupling or release occurs. The sensors are configured to detect both the distance of the hooking groups and the alignment of the hooking groups both horizontally and vertically.

In this way, computer systems placed on the two carriages, based on the information received from the sensors, can manage the speed of the carriages, the height and the verification of the oscillations of the hooking groups so that the hooking is possible in complete safety.

According to one aspect of the invention, during the coupling phase, the position, retracted or inserted, that the screw 523 assumes in the heads of the two coupling units 510 and 510' is determined by the dialogue between the electronic systems present on the carriages.

According to one aspect of the invention, alternative sensor systems (e.g. with image processing) to determine distance and speed can be used alternatively.

According to an aspect of the invention, one or more cameras will be present on the group 510 and/or on the head of the wagon to remotely monitor the execution of the coupling maneuver and the locking of the coupling group 510, with the images transmitted to an operator, on the locomotive or in the station, who must certify its correct execution.

According to an aspect of the invention, an obstacle detection system, for example with laser sensors, may be present on the group 510 or on the head of the wagon, also for the protection of the coupling system which, in the event of unexpected obstacles, can be retracted into the position of safety 82b.

According to an aspect of the invention, an alternative or complementary GPS device to those already present on the intelligent carriage may be present on the 510 unit or in another position.

According to an aspect of the invention, an autonomous communication device may be present on the group 510 or in another position which, for example with the OTA methodology, will allow to communicate and interact autonomously with other devices and/or with operators for operational needs (e.g. for maintenance, for manual locking/unlocking operations, for positioning the 510 group, etc.).

According to an aspect of the invention, the group 510 can be mounted while maintaining all the automatisms, through appropriate mechanical fittings, even to wagons without buffers that adopt a single elastic traction/repulsion system placed in the center of the wagon's upright. In this case, the spring 522 can be omitted and the element 512 is connected to the group 510 in the same way as described above for the connection of the body 512 to the body 513.

According to an aspect of the invention to allow automatic coupling between different carriages equipped with the same front structure of the body 510, one with a traditional elastic system (buffers and towing spring) and another with a single central elastic system for both traction and repulsion and without buffers, the element 513e can be made with a shaped structure to be held by a corresponding opposite structure rigidly anchored to the wagon, not shown in the figure, which prevents the movement of the system 500 towards the inside of the wagon in such a way not to compress element 92a.

Figure 12:
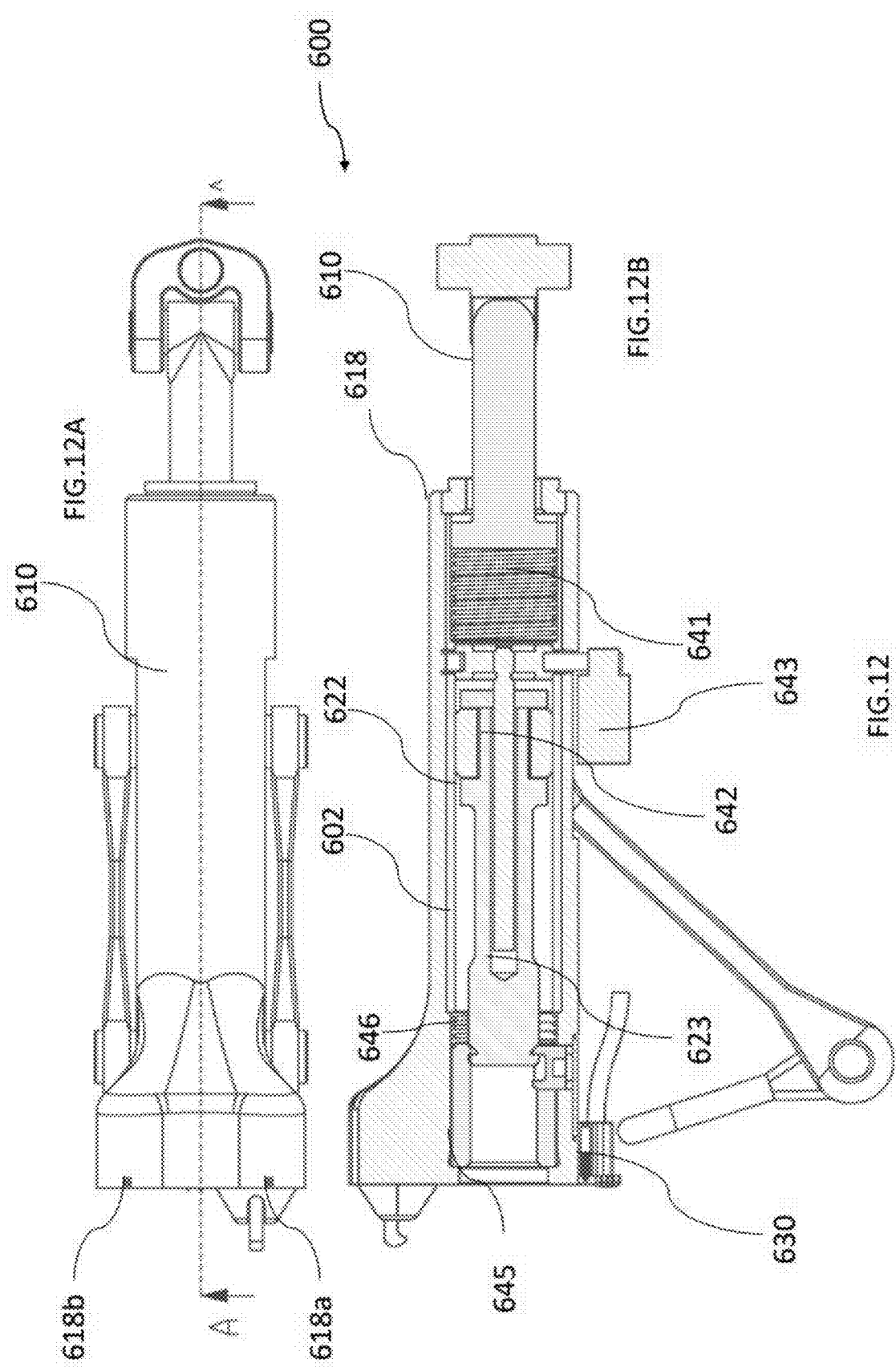
FIGS. 12A-12B show respectively a top view and a sectional view of a second embodiment of the system for automatic coupling and release of vehicles travelling on the railway network, according to the invention.

FIG. 12 shows a second embodiment 600 of the system for automatic coupling and release of vehicles travelling on the railway network of a first circulating vehicle, for example a railway wagon, comprising a first hooking group 610 of the first circulating vehicle, not shown in the figure. The first hooking group 610, identical to the second hooking group, consists of a block comprising joint elements, both traditional and automatic, with a second circulating medium, a section with electrical, electronic and pneumatic connections 630 and a group of sensors, components of actuation and control, verification and surveillance systems not shown in the figure.

The description made here for the first hooking group is to be considered equally valid for the second hooking group.

Advantageously according to the invention, the system 600 is of the type reported in the Italian patent application 102019000007566 of the same Applicant, already cited.

Figure 13:
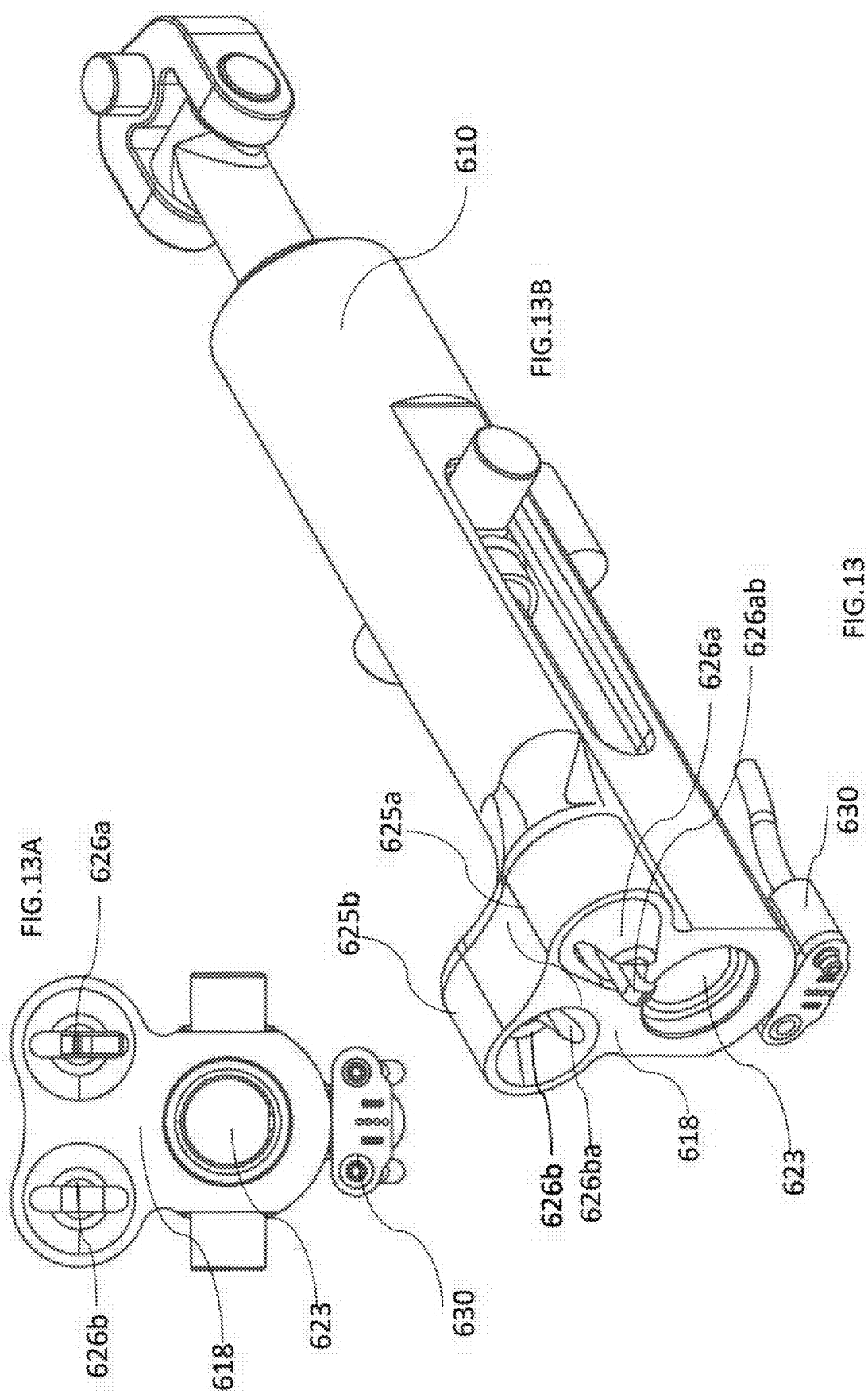
FIGS. 13A-13B show axonometric and front elevation views of a first coupling group of a first means of the second embodiment of the system for automatic coupling and release of vehicles travelling on the railway network, according to the invention.
Figure 14:
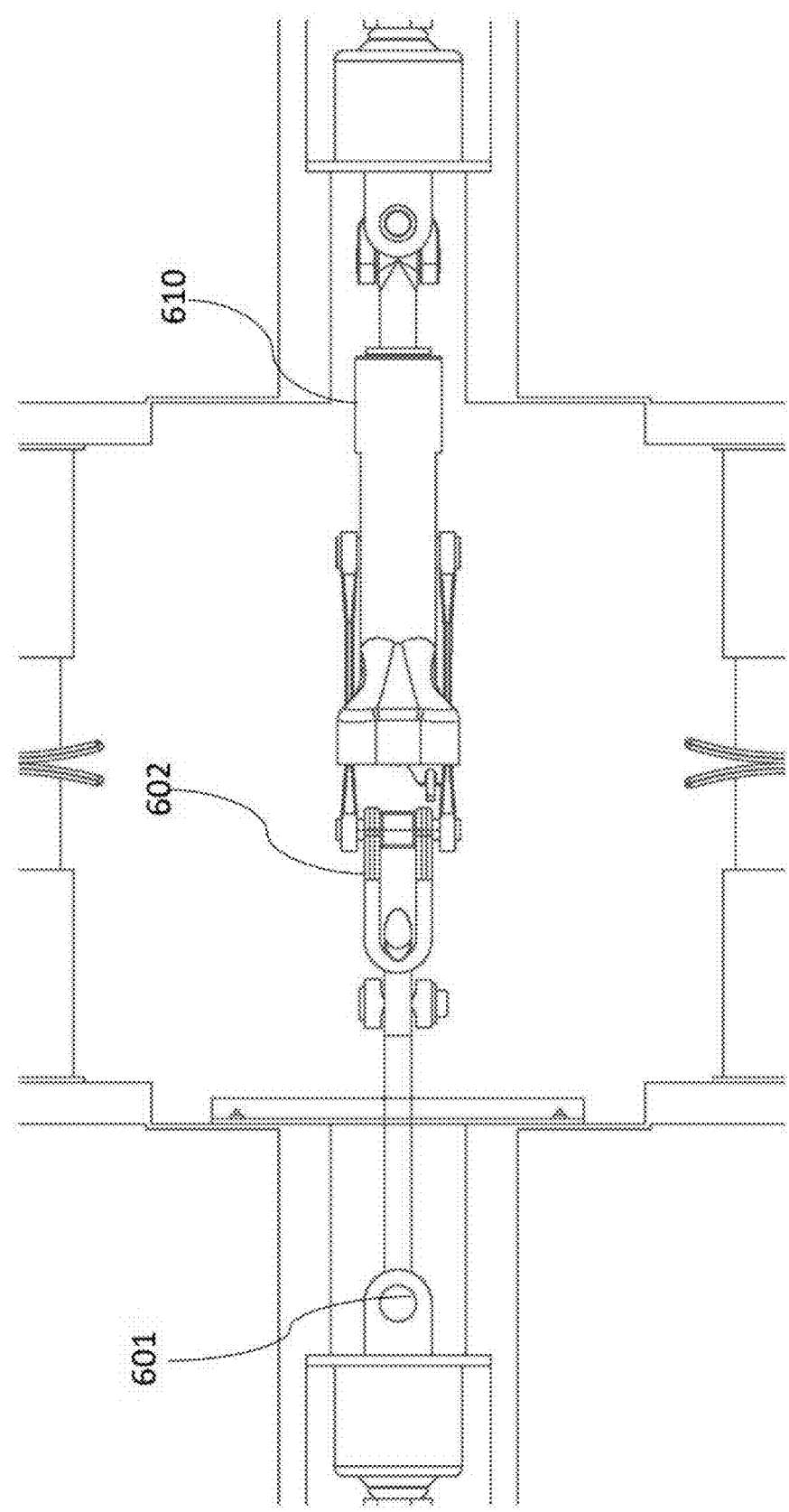
FIG. 14 shows a schematic top view of a handle coupled to the first hooking unit of FIG. 13 in the phase of hooking to a hook of a second means of the second embodiment of the system for automatic coupling and release of vehicles travelling on the railway network, according to the invention.

Advantageously according to the invention, the system 600 comprises an elastic system 601, shown in FIG. 14, and a handle 602, already shown in FIG. 13 and better shown in FIG. 14, anchored to the sides of the hooking unit 610 and configured to hook of another carriage in traditional mode, advantageously facilitating backwards compatibility to allow coupling. The system thus conceived allows the transfer of traction forces respecting the same axis of the automatic coupling.

According to an aspect of the invention, each hooking group 610 includes a central mechanism for the horizontal and vertical alignment of the head of the hooking group which can be made with purely mechanical systems and therefore without actuators.

Figure 16:
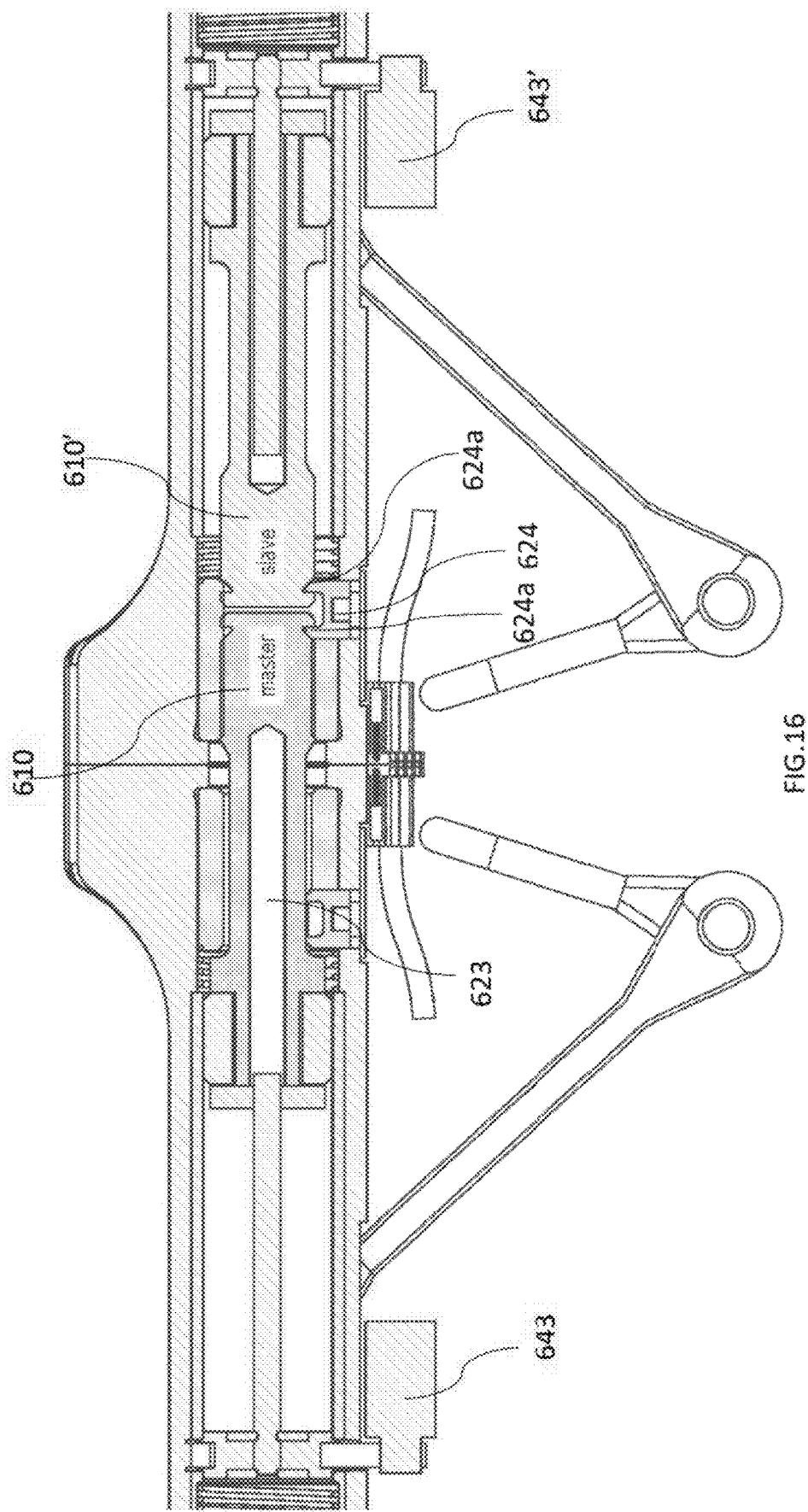
FIG. 16 shows a sectional view of two coupled means of the second embodiment of the system for automatic coupling and release of vehicles travelling on the railway network, according to the invention.

According to an aspect of the invention, as better shown in FIG. 13, the hooking group 610 comprises an automatic head comprising a frontal structure 618 comprising a first and a second truncated cone-shaped protrusion 625a and 625b with a protrusion 626a at the head respectively facing outwards and a recess 626b facing inwards, so as to be complementary in coupling with those of a second specularly positioned hooking unit 610', as shown in FIG. 16. The frontal structure 618 also comprises, in a region located at the bottom and centered with respect to the two protrusions 625a and 625b, a screw body 623 retractable, in retraction, inside a tubular cavity 622 of the hooking group 610 or insertable, in advance, inside a corresponding thread included in the head of a second hooking group to be coupled to the first hooking group, so that it can be screwed to its internal and in such a way as to also ensure the firm union of the two heads 610 and 610' of the first and second hooking group.

As shown in FIG. 12, the head of the first hooking group 610 comprises a horizontal shaft 642 inserted inside the screw 623 and operable by means of an actuator 643, configured to advance and screw the screw 623 into the thread included in the head of a second group hooking or to make it move back into position inside the tubular cavity 622.

More specifically, according to one aspect of the invention, the screw body 623 is internally hollow to allow the sliding of the shaft 642 inside it during the screwing or unscrewing operation.

According to one aspect of the invention, the system 600 includes a mechanism for the pre-coupling inserted inside the two protrusions 625a and 625b. In particular, as shown in FIG. 13, the first protrusion 625a comprises at the head of the protrusion 626a facing outwards a clamp 626ab and the second protrusion 625b comprises at the head of the second hollow protrusion 626b a plate 626ba which can be coupled to the clamp of a first protrusion of the second hooking group 610'.

According to an aspect of the invention, the system 600 comprises a locking mechanism 624 of the screw 623, better shown in FIG. 16. The mechanism consists of a spring actuated block equipped with two teeth 624a which allow the locking of the two screws 623 of the two hooking groups, once the coupling has taken place. To allow the master screw 623 of the first coupling group 610 to uncouple, the slave screw 623' of the second coupling group 610' must make a half forward rotation to disengage the block 624 and allow the release operation. The locking system of the unscrewing of the master screw of the first hooking group 610 by the slave hook of the hooking group 610' makes any accidental release impossible as for this type of operation system anomalies should occur due to accidental or malicious causes of the two systems in question. concomitance. The anti-unscrewing lock can also be made in different ways, while maintaining the previously described functions.

According to an aspect of the invention, the system 600 includes a mechanism to allow, in the production phase, a tolerance of the start of the coil for the entry of the screw in the phase of coupling to the head unit of the other carriage. In detail, the first hooking group 610 is equipped at the front with a mother screw 645 which can retract inside 610 and is equipped with a spring 646 which keeps it pushed forward.

During the coupling phase, after the pre-coupling occurred, the master screw 623, inserting itself inside the 610' slave group, pushes the nut screw 645' until it finds the correct phase for the actual insertion and screwing.

According to an aspect of the invention, the body 618 has, in its lower part, a structure 630, better shown in FIGS. 12 and 13, comprising pneumatic, electrical and electronic connections.

According to one aspect of the invention, in the structure 630 connected to the air fittings there are, not shown in the figure, pressure gauges and electronic valves with air flow control managed by the electronic system from which they are managed and with which they communicate. The structure 630 is movable horizontally along the body 618 shaped for the forward and backward sliding of the structure 630 by means of an actuator not shown in the figure. The air connection to the main pipeline, not shown in the figure, is made by means of a flexible pipe which is connected to the main pipeline by means of a switching valve, managed by the electronic system of the wagon, which allows the passage of air from the automatic hook when in use in automatic mode, or from the traditional tap placed on top of the wagon, when this is hooked in classic mode. The protrusions 626a and 626b are suitable for coupling, as described in the patent application 102019000007566 to protrusions projecting in the opposite direction of a second hooking group of a second railway vehicle, having such protrusions complementary sections to similar protrusions present in the second hooking group, in a way such as to be wedged one inside the other to make the coupling of the two coupling groups together.

Figure 15:
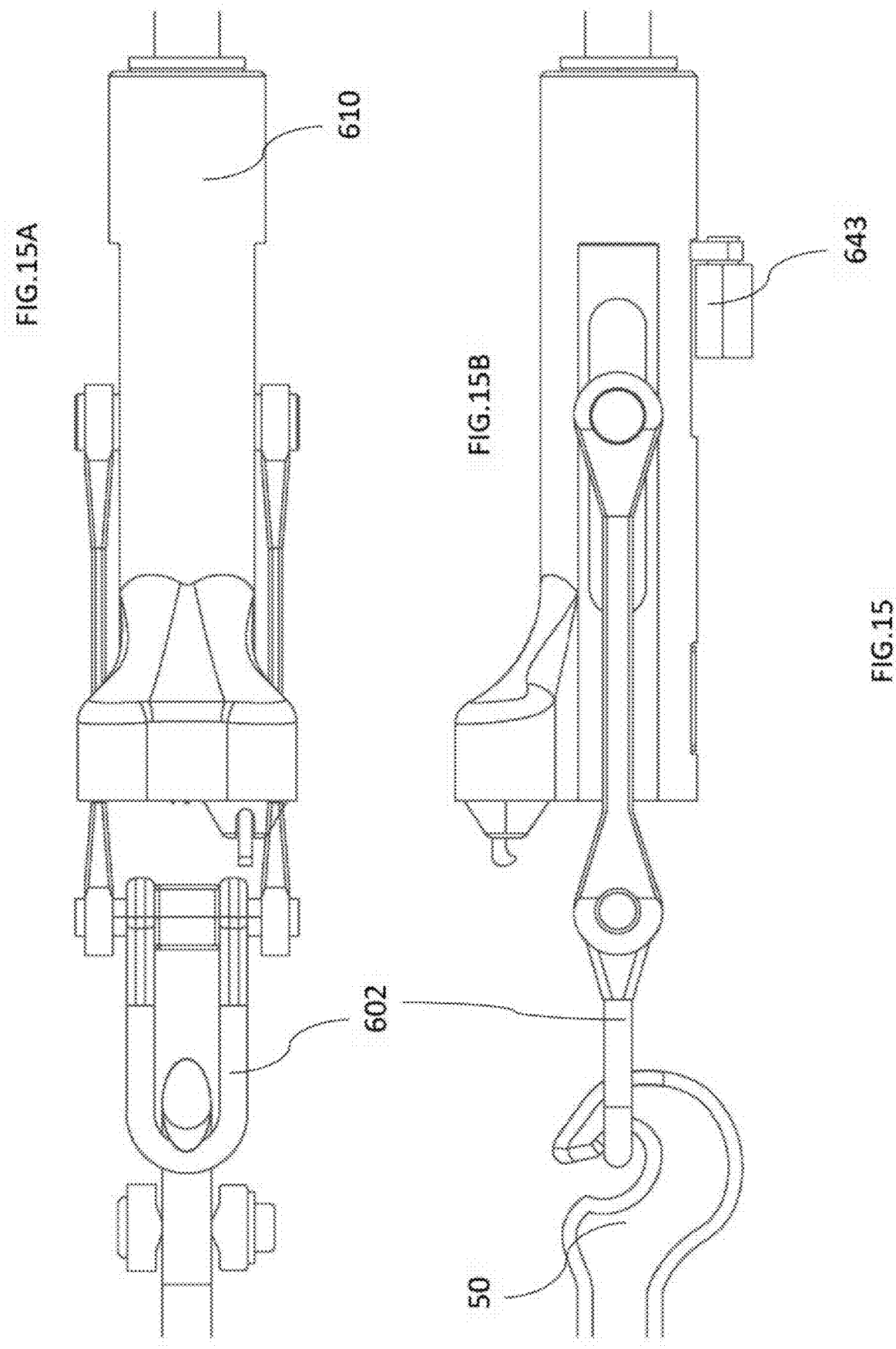
FIGS. 15A-15B show respectively a top view and an enlarged side elevation view of the handle coupled to the hook of the second means, according to the invention.

As shown in FIG. 15, the first hooking group 610 is hooked by means of the handle 602 to a tow hook 50 of the traditional type placed on a traditional wagon.

According to an aspect of the invention, the hooking group can also be mounted in hooking systems with a central elastic system and without buffers.

In use, the system for automatic coupling and release of at least a first vehicle having a cushioning system and of a second vehicle travelling on the railway network, used in the classic manner, provides that the coupling unit can be coupled to any currently circulating wagon and with the same methods currently in use. In this mode the actuator 643 will rotate the screw 623 configuring the hooking group as in FIG. 14. The air connection will be made with the classic fittings, ignoring the automatic head, connecting with these to the traditional duct whose continuity is ensured by the changeover valve installed on the carriage described above suitably configured.

In automatic mode the wagon will be able to connect only with wagons of the same type. During the approaching phase of the wagons, the horizontal and vertical alignment will be guaranteed by a series of self-centering mechanical joints not shown in the figure which, during the rest phase, place the system in a centered position with respect to the axis of the wagon. centering bar placed on the head to carry out self-centering even in relatively unfavorable conditions. During the approach of the two wagons to be coupled, with two inertial movement units, one placed on board the wagon and the other placed on the head 610, the oscillations to which the wagon is subjected will be determined and it will be assessed whether the conditions for safety for hooking up. In the event of a negative evaluation, the speed of the wagon will be lowered until the oscillations are within the safety limits. The distance between the wagons to be coupled can be constantly monitored by a sensor that determines the values and communicates them to the wagon management system. Following the pre-coupling, made automatically on contact between the heads of the two coupling units 610 and 610', obtained through the clamp system 626*ab*/and plate 626*ba*, the sensor system 618*a* and 618*b* shown in FIG. 12 and placed on the front 618 verifies the perfect coupling of the latching units 610 and will order the effective sealing connection, by retreating the screw 623 of the unit 610 and the screwing of the screw 623' of the unit 610', carried out by the actuator 643, shown in the FIG. 15, which, by rotating the transmission shaft 642, will cause its rotation. The screw 623 is hollow on the side of the drive shaft 642 to allow its penetration during its forward and backward movement. Once the coupling has been carried out and verified, the connection of air, electricity and data will be carried out, also managed through the electronic control system of the hook which will control an actuator. To avoid compression stresses, which could compromise the components downstream of the head, the spring 641 acts as a damping device, so that the coupling occurs in complete safety and in case of excessive compression effort between the moving carriages when the buffers come into operation.

As shown in FIG. 16, the screw 623 of a master carriage, while screwing inside the slave carriage, meets the nut screw 645 which is able to make small movements that allow the master screw to continue turning until the moment in which it finds the right phase and screw. Once it is completely screwed inside the slave carriage, it loses the thread of the master in the tubular cavity 622 thus carrying out the pre-tensioning of the two heads.

Therefore, the system for automatic coupling and release of at least a first vehicle and of a second vehicle travelling on the railway network according to the invention allows the necessary maneuvers to be carried out automatically with high tensile strength.

Another advantage of the system for automatic coupling and release of at least a first vehicle and of a second vehicle travelling on the railway network according to the invention is to be compatible with the coupling systems of traditional wagons.

A further advantage of the system for automatic coupling and release of at least a first vehicle and of a second vehicle travelling on the railway network according to the invention is to ensure the horizontal alignment of the coupling mechanisms between the circulating vehicles to be coupled, both with a stationary wagon and with both wagons in motion.

Finally, the system for automatic coupling and release of at least a first vehicle and of a second vehicle travelling on the railway network according to the invention enables facilitated rail transport.

Finally, it is clear that modifications and variations can be made to the system for automatic coupling and release of at least a first vehicle and of a second vehicle travelling on the railway network described and illustrated here without departing from the protective scope of the present invention, as defined in the attached claims.

The invention claimed is:

1. A system for automatic coupling and release of at least a first vehicle having a cushioning system and of a second vehicle travelling a railway network comprising:
    at least a first hooking group of the first vehicle, comprising an automatic head comprising a first and a second terminal element configured to be coupled to each other with complementary interlocking, each constituted by a frontal structure provided with a protrusion, projecting horizontally towards the outside of the first hooking group and with a recess projecting horizontally towards the inside of the first hooking group; a retractable screw body; and a horizontal shaft coupled to the screw body and operable by an actuator for the advancement and retraction of the screw body;
    at least a second hooking group of the second vehicle, comprising an automatic head comprising a first and a second terminal element configured to be coupled to each other with complementary interlocking constituted by a frontal structure provided with a protrusion, projecting horizontally towards the interior of the second hooking group, and a recess projecting horizontally towards the outside of the second hooking group, the protrusion and the recess having sections such as to be complementary to the recess and the protrusion of the first hooking group;
    wherein the frontal structure of the first hooking group comprises, in a central region comprised between the first protrusion and the second protrusion, the retractable screw body;
    wherein the first hooking group comprises a tubular cavity, configured to house the screw body in retraction; and
    wherein the second hooking group comprises a thread configured to screw the screw body in advance.

2. The system according to claim 1, wherein the recess comprises an electromagnet and the protrusion comprises a metal plate, which can be coupled respectively to a metal plate and to electromagnets present in the protrusion and in the recess of the second hooking group.

3. The system according to claim 1, further comprising a mechanism for pre-hooking the first and second hooking group comprising a clamp positioned at the head of the protrusion facing outwards and a plate positioned at the head of the recess and can be coupled to the clamp.

4. The system according to claim 3, further comprising a locking mechanism of the screw comprising a spring-actuated lock equipped with two teeth suitable for locking the screw body of the first hooking group and of the screw body of the second hooking group, once the coupling has taken place, and the release of the second hooking group from the first hooking group by a half forward rotation of the body a screw of the second hooking group.

5. The system according to claim 3, wherein the first hooking unit is equipped in the front part with a lead screw equipped with a spring configured to keep it pushed forward and to retract inside it, once pre-hooking has taken place, pushed by the screw body of the first hooking group, inserting itself inside the second hooking group.

6. The system according to claim 3, further comprising sensors placed on the frontal region communicating with a management system of the vehicle, following the pre-coupling, signals for checking the perfect coupling of the first hooking group and of the second hooking group and signals to make the effective sealing engagement take place, following the retraction of the screw of the first hooking group and the screwing of the screw of the second hooking group, actuated by the actuator, which, by rotating the transmission shaft, determines its rotation.

* * * * *